United States Patent [19]

Banikiotes et al.

[11] 3,796,059

[45] Mar. 12, 1974

[54] CRYOGENIC PURIFICATION OF HYDRODEALKYLATION AND REFINERY HYDROGEN OFF-GAS STREAMS

[75] Inventors: Gregory C. Banikiotes, Seaford, N.Y.; Joseph Meisler, Teaneck, N.J.; Edward H. Van Baush, Pearl River, N.Y.

[73] Assignee: Hydrocarbon Research, Inc., New York, N.Y.

[22] Filed: May 17, 1972

[21] Appl. No.: 253,988

[52] U.S. Cl. .............................. 62/23, 62/22, 62/17, 62/39

[51] Int. Cl. .............................. F25j 3/00, F25j 3/06

[58] Field of Search ........... 62/9, 11, 23, 24, 38, 39, 62/22, 16

[56] References Cited

UNITED STATES PATENTS

| | | | |
|---|---|---|---|
| 3,628,340 | 12/1971 | Meisler | 62/23 |
| 3,626,705 | 12/1971 | Knapp | 62/23 |
| 3,363,428 | 1/1968 | Charlesworth | 62/23 |
| 3,359,744 | 12/1967 | Bolez | 62/23 |
| 3,433,027 | 3/1969 | Charlesworth | 62/39 |
| 3,223,745 | 12/1965 | Davison | 62/23 |
| 3,691,779 | 12/1972 | Meisler | 62/23 |
| 3,553,972 | 1/1971 | Markbreiter | 62/39 |

*Primary Examiner*—Norman Yudkoff
*Assistant Examiner*—Arthur F. Purcell

[57] ABSTRACT

The hydrodealkylation of toluene to benzene involves the utilization of large quantities of relatively expensive hydrogen. Of the hydrogen consumed, part is obtained by the recovery of unused hydrogen from the reactor through purification and recycling, while the remainder is supplemented by make-up hydrogen recovered from refinery off-gas streams. An integrated cryogenic process handles the dual purification of these two separate hydrogen streams to recover a single high purity hydrogen product and the valuable by-product components contained in said streams while maintaining optimum energy consumption.

1 Claim, 1 Drawing Figure

HDA Reactor
10
12
Hydrogen
14
16
$H_2S$ Removal
18
Platformer
70
72
Moisture Removal
74
Fuel Gas
Aromatics
36
48
76
86
To Hydrogen Product
12
Compressor
Exchanger
80
90
92
P
40
32
30
34
37
Exchanger
20
50
44
42
48
84
78
Exchanger
22
46
47
V
82
60
Expander
62
60
54
52
Exchanger
24
64
64
56
57
V

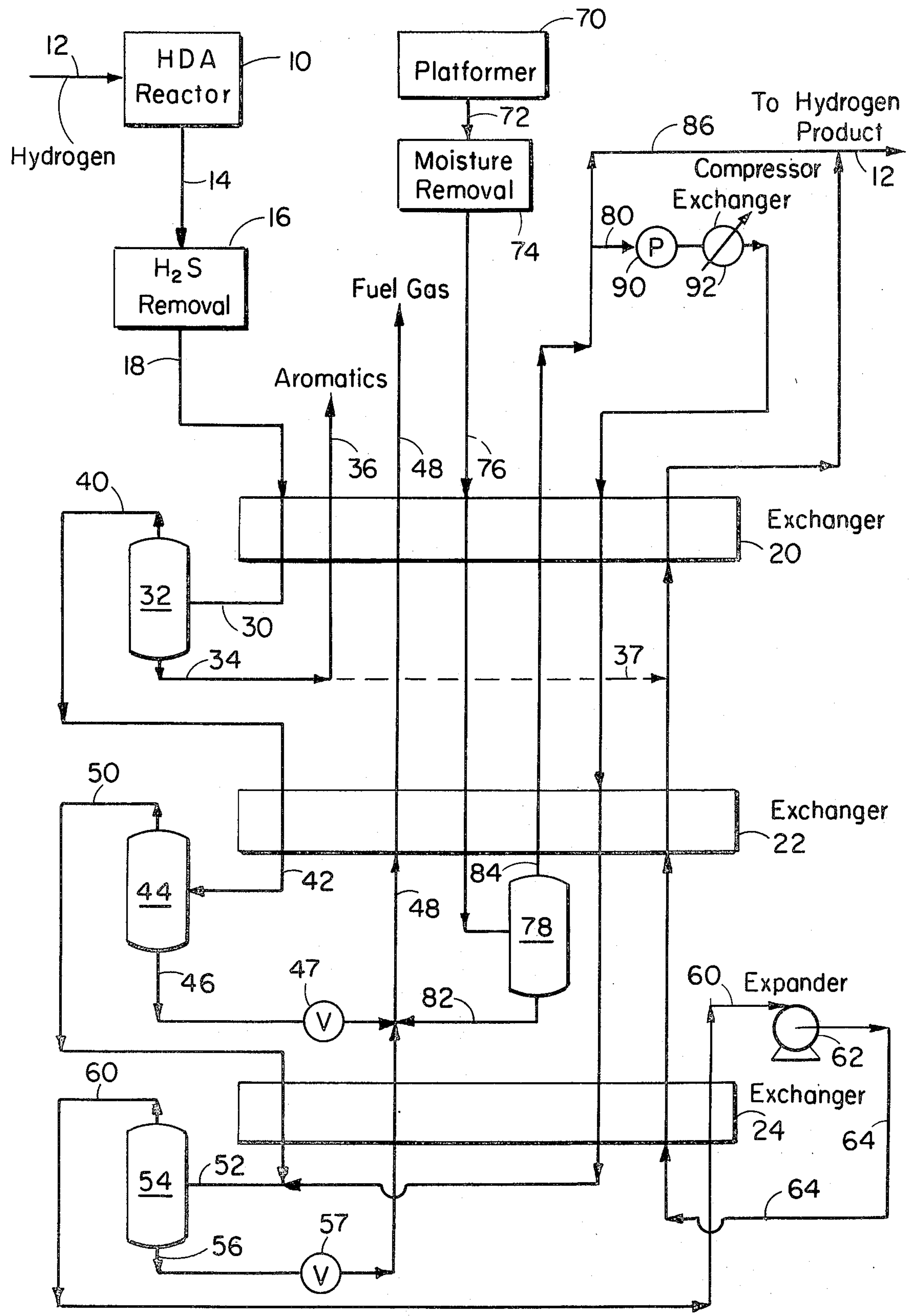
HDA Reactor
Hydrogen
H2 S Removal
Platformer
Moisture Removal
Fuel Gas
Aromatics
To Hydrogen Product
Compressor
Exchanger
P
Exchanger 20
Exchanger 22
Exchanger 24
Expander
V
12
10
14
16
18
70
72
74
76
86
80
90
92
36
48
40
32
30
34
37
50
44
42
84
78
46
47
82
60
62
64
54
52
56
57

CRYOGENIC PURIFICATION OF HYDRODEALKYLATION AND REFINERY HYDROGEN OFF-GAS STREAMS

BACKGROUND OF THE INVENTION

In the U.S. Pats., No. 3,291,849 on Hydrodealkylation and U.S. Pat. No. 3,628,340, Process for Cryogenic Purification of Hydrogen, reference is made to the purification of impure hydrogen streams as for a hydrodealkylation plant. In the first above mentioned patent a process is disclosed in which the vent hydrogen is treated by an absorption process. In the second above mentioned patent, a cryogenic system has been disclosed which requires certain outside or external refrigeration.

The recovery of relatively pure hydrogen is an essential requirement for effective hydrodealkylation operations and the vent gas to the extent possible, must be purified and simultaneously a valuable by-product must be made available for credit to the operating cost.

Make-up hydrogen for the hydrodealkylation operation is frequently available from other plant operations. A typical source of such hydrogen is catalytic platformer reforming which produces a hydrogen-containing tail-gas. Such stream is also generally impure and must be treated to produce high purity make-up hydrogen required for hydrodealkylation.

Further, it is known that the quality of the platformer tail gas drops off as the catalyst becomes deactivated. Yields of the respective streams may also change during a normal hydrodealkylation operation. Prior treating processes have proved inadequate for the production of the required purity and quantity of hydrogen commercially required.

SUMMARY OF THE INVENTION

We have found that a system of cryogenic equipment, including expanders, heat exchangers, separating tanks, etc., can be interconnected to permit a constant high yield of a high purity hydrogen from two or more impure hydrogen feed streams each of which may vary in composition and quantity.

The system contains an inherent flexibility for operating successfully within a range of feed compositions and flow rates. Specifically, the refrigeration expander and recycle compressor can be adjusted to maintain the required amount of low temperature level refrigeration for producing the specified product purity when the hydrogen content in the feed exceeds, or, when the volume of the high boiling components in the feed is less than the system requires. Although the composition and flow rate of the hydrodealkylation vent gas normally varies but little, the platformer tail gas will vary in composition and flow rate with the life or efficiency of the reforming catalyst. The flexibility of the proposed system becomes advantageous for producing a constant hydrogen product of required purity.

The proposed system is further used to advantage in making available the total hydrocarbon effluent stream at fuel gas header pressure without necessitating the use of additional compression equipment.

The operating flexibility of the system also allows the compressor on the hydrogen product line to operate at higher suction pressure thereby increasing the capability of this equipment to supply a larger volume of hydrogen than specified by the system's design criteria.

When processing separately the two feed streams, the following conditions exist:

1. Almost all the ethane-ethylene and higher hydrocarbon components contained in the platformer tail gas stream are recovered.

2. Almost all the aromatic components contained in the hydrodealkylation vent gas stream are recovered at an elevated pressure sufficient to recycle them directly to the hydrodealkylation plant in the liquid phase, or as a vapor admixture with the purified hydrogen stream from the cryogenic plant.

DESCRIPTION OF THE DRAWING

The drawing is a schematic showing of a hydrodealkylation operation utilizing a cryogenic separation of impurities from the vent hydrogen stream as well as from the make-up hydrogen stream from a platformer.

DESCRIPTION OF THE PREFERRED EMBODIMENT

An integrated cryogenic process is described for the dual purification of two separate hydrogen streams to recover a single high purity hydrogen product and valuable by-product components contained in said streams at optimum energy consumption.

In a hydrodealkylation reaction, schematically shown as a reactor 10, a relatively pure hydrogen gas feed 12 is required and a vent gas is removed at 14. Usually, this must be treated for water removal and as in the hydrogen sulfide removal unit 16 to partially purify the impure hydrogen 14.

This hydrodealkylation vent gas 14, purified of such contaminants 18, then enters the cryogenic separation system at ambient temperature and is progressively cooled in exchangers 20, 22 and 24 with cooler effluent streams to the required product purity dew point temperature.

The partially cooled hydrodealkylation vent gas 30 leaving exchanger 20 at about −60° F is phase separated in vessel 32 into a bottoms liquid 34 and a vaporous overhead stream 40. The bottoms liquid contains the aromatic components of the feed stream, and the aromatics are removed at 36 in the liquid state after suitable heating in exchanger 20 to about 90° F. If desired, this aromatics stream may be recycled to the hydrodealkylation system at high pressure. The aromatics may also be recovered as a vapor in admixture with the hydrogen product by injecting the liquid stream 34 into the purified hydrogen product stream 64 leaving exchanger 22, vaporizing the mixture in exchanger 20, and recycling the mixed vapors to reactor 10 via line 12.

The overhead vapor 40 leaving vessel 32 is further cooled in exchanger 22 to about −210° F and the resulting vapor-liquid mixture 42 is phase separated in vessel 44. The liquid bottoms 46 is reduced to fuel gas header pressure in valve 47 and is vaporized in exchangers 22 and 20 and is discharged through line 48.

The overhead vapor stream 50 removed from vessel 44 is further cooled in exchanger 24 to about −245° F and discharges in line 52 into vessel 54 wherein it is phase separated. The liquid bottoms leaving at 56 is reduced in pressure at 57 and is also introduced into the fuel gas line 48, after vaporization in exchanger 24.

The overhead leaving at 60 is rewarmed in exchanger 24 and then is reduced in pressure in expander 62 in order to make available the required low temperature level refrigeration for balancing the plant thermally. The product stream leaving at 64 is warmed to ambient temperature in exchanger train 24, 22 and 20 and supplies the major hydrogen requirement of 90 to 97 percent purity at 12 for the hydrodealkylation plant.

When there is a substantial requirement for make-up hydrogen a hydrogen-rich tail gas stream 72 from a catalytic platformer unit 70 can be used to complement the hydrodealkylation vent stream 14 after treatment in suitable desiccation devices 74.

The tail gas stream 76, dried to a dew point equivalent of below −100° F, is cooled sequentially in exchangers 20 and 22 and then phase separated in vessel 78.

The hydrocarbons having been removed from the tail gas as bottoms liquid at 82, the pure hydrogen product is removed at 84 and after being appropriately warmed in exchangers 22 and 20, is added at 86 to the hydrogen product stream 12.

The bottoms liquid removed at 82 from vessel 78 is appropriately introduced into the fuel gas line 48.

A part of the overhead hydrogen vapor 80 from the vessel 78 after being rewarmed in exchangers 22 and 20 is compressed in compressor 90 to hydrodealkylation vent gas pressure, intercooled at 92 and further cooled in exchanger train 20, 22 and 24. It is then mixed with the cooled vapor stream 50 and also phase separated in vessel 54.

The two hydrogen feed streams have the following typical characteristics:

EXAMPLE I

A. Raw Material Feed

| Platformer Tail Gas | | Hydrodealkylation Vent Gas |
|---|---|---|
| | Mol.% | |
| $H_2$ | 78.0 | 55.0 |
| Methane | 11.0 | 43.5 |
| Ethane | 6.0 | 1.3 |
| Propane | 3.0 | |
| Butane | 1.5 | |
| Pentane | 0.5 | |
| Benzene | TRACE | 0.02 |
| Toluene | | 0.18 |
| $H_2S$ (P.P.M.) | (20) | 100 |
| Water (P.P.M.) | (30) | |
| HCL (P.P.M.) | (1) | |
| MMSCFD | 11.0 | 8.8 |
| Pressure, PSIG | 280 | 510 |
| Temperature, °F | 100 | 90 |

B. HYDROGEN PRODUCT

Purity — 90.0 Mol.% Minimum

Pressure — 705 PSIG to Hydrodealkylation Plant

Temperature — 100° F to Hydrodealkylation Plant

While we have shown and described a preferred form of embodiment of this invention, we are aware that modifications may be made thereto within the scope and spirit of the description and of the claims appended hereinafter.

We claim:

1. An improved process for the cryogenic purification of hydrodealkylation and refinery off-gas streams containing impure hydrogen which are at a pressure between about 300 and 900 psia which comprises:

a. purifying a first gas stream of hydrogen sulfide and moisture content;

b. cooling said purified gas stream in a first heat exchange means to about −60° F through indirect countercurrent flow with product streams from the process;

c. separating a partially purified gas stream overhead and a first liquid aromatics bottoms fraction in a first phase separator;

d. expanding said first bottoms to a first vapor-liquid mixture and passing it reversely through said first heat exchanger means to remove it as a liquid aromatics product at about 90° F, or, as a vapor admixture with the hydrogen product stream at about 90° F;

e. further cooling said partially purified gas stream to as low as −210° F in a second heat exchange means through indirect countercurrent flow with the lower temperature product streams from the process;

f. separating a further purified gas stream overhead and a second liquid bottoms in a second phase separator;

g. expanding said second bottoms to a second vapor-liquid mixture comprising methane, ethane and heavier hydrocarbons and passing said second mixture reversely through said second heat exchange means and then through said first heat exchange means;

h. further cooling said gas stream in (g) to about −245° F in a third heat exchange means through indirect countercurrent flow with the lower temperature product streams from the process;

i. separating a hydrogen gas overhead of 90 to 97 percent purity and a third liquid bottoms in a third phase separator;

j. expanding said third bottoms to form a third vapor-liquid mixture and passing said third mixture reversely through said third and said second and said first heat exchange means to recover fuel gas at plant pipeline pressure;

k. passing said hydrogen gas reversely through said third and said second and said first heat exchange means to recover an ambient product at a reduced pressure resulting from the pressure loss inherent in the system;

l. maintaining an independent sub-cooling means including an expander interconnected to said hydrogen product connected with said third heat exchange means to provide critical cooling requirements down to at least at low as −265° F;

m. drying a second gas stream at a lower pressure to a dew point below −100° F and cooling said second gas stream in said first and said second heat exchangers to about −210° F and then phase separating said second gas stream to remove fuel gas and hydrogen components wherein said second gas stream provides a common high pressure hydrogen product stream; and n. expanding the liquid aromatics bottoms from the first phase separator and admixing with the hydrogen product stream leaving said second exchanger and said bottoms vaporized in said first exchanger by heat exchange with warmer feed streams and further by equilibrations with the admixed hydrogen product stream.

* * * * *